T. M. FELL & H. B. BUNSTER.
METHOD OF UTILIZING BISULPHIDE OF CARBON AS A MOTIVE POWER.
No. 191,327. Patented May 29, 1877.
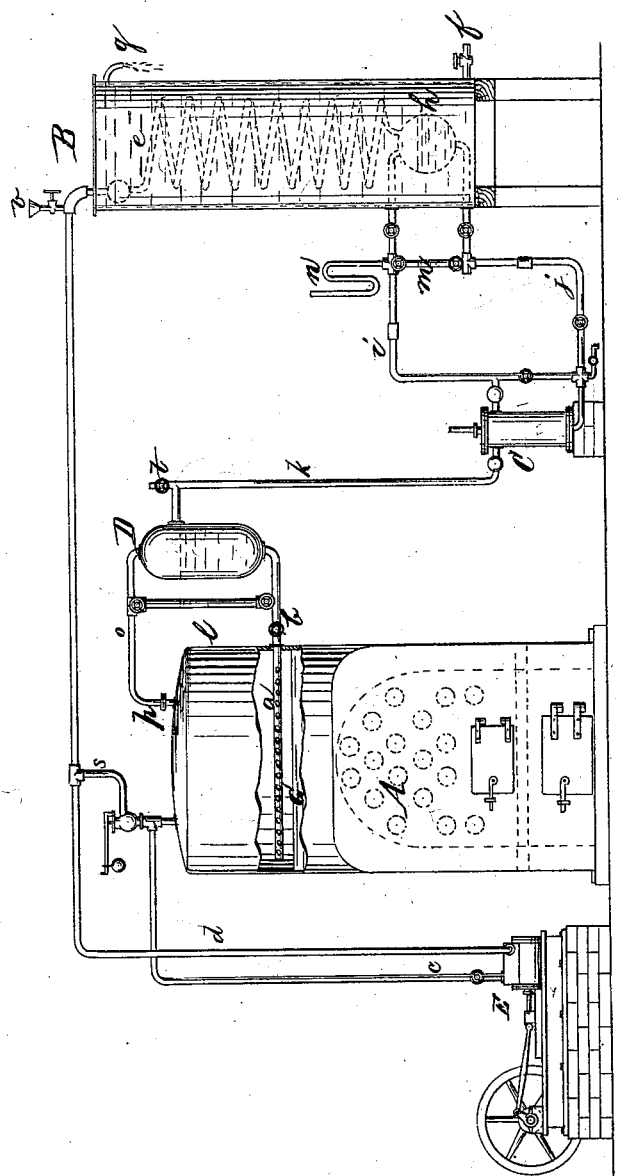

UNITED STATES PATENT OFFICE.

THOMAS M. FELL, OF BROOKLYN, AND HENRY B. BUNSTER, OF NEW YORK, N. Y., ASSIGNORS TO THEMSELVES AND WILLIAM G. SMITH.

IMPROVEMENT IN METHODS OF UTILIZING BISULPHIDE OF CARBON AS A MOTIVE-POWER.

Specification forming part of Letters Patent No. 191,327, dated May 29, 1877; application filed November 9, 1876.

*To all whom it may concern:*

Be it known that we, THOMAS MARA FELL, of the city of Brooklyn, county of Kings and State of New York, and HENRY G. BUNSTER, of the city, county, and State of New York, have invented a new Method of Obtaining Motive-Power by the use of heated glycerine, or a compound thereof, in combination with bisulphide of carbon, of which the following is a specification:

Our invention consists of a new and useful method of utilizing bisulphide of carbon as a motive-power, viz., by bringing it in contact in a boiler or suitable receptacle with heated glycerine or a compound thereof.

Hitherto the attempts to obtain motive-power from this source have been, as far as we are informed, more or less unsuccessful in the application. Bernard Hughes, in the year 1854, patented the injection of bisulphide of carbon into a body of water, and used the vapor for the propulsion of machinery; and at no time have scientific men questioned the great economy to be derived from the use of power from this source. Since this pioneer patent a number of inventors have produced various mechanical contrivances of condensers and evaporators, with a view of cheaply evaporating, controlling, and applying this force. Surfaces of metal heated by liquid mediums, such as oil, zinc, salt, and other solutions have been used instead of the direct application of heat. The result in each and every case was the same—abundance of power at the expense of decomposition.

It is believed that hitherto the use of bisulphide of carbon, owing to the chemical affinities of its elements, has not been practically a success. The formula of this substance is $CS_2$, both for its liquid and vapor. In this normal condition it is non-corrosive. When, however, this dry vapor is exposed to water, as in the case of Hughes' and other plans, or brought in contact with the moisture of air contained in the various vessels or pipes, a chemical separation or decomposition is at once produced, the metal becomes a sulphuret, and carbon of the bisulphide is set free. Glycerine is chemically and mechanically distinct from all other substances in its action with bisulphide of carbon. It is not an oil, or even analagous thereto, although one of the constituents of both animal and vegetable fats. Glycerine has no affinity like an oil for bisulphide of carbon. Glycerine, in the presence of a dense vapor like bisulphide of carbon, is capable of mechanical evaporation with such vapor. Glycerine is a much better conductor of heat than water, and capable of being heated to a certain degree with a less proportion of fuel, while it is further capable of storing up caloric to about 500° Fahrenheit. When heated, it becomes thin and spreads over the surface of metal, and as there is no chemical admixture produced with the liquid or vapor of bisulphide of carbon, the same becomes a perfect mechanical protection and lubricator to such surface.

The properties of bisulphide of carbon are well known. It is easily evaporated into a dense vapor, the gravity of which is 2.621, by a heat of 110° Fahrenheit. The latent heat absorbed for vaporization is about 280° Fahrenheit, that of steam being nearly 1,000°, or a saving in fuel of seventy-one per cent.

To produce motive-power by our invention, we first fill, or partially fill, any suitable vessel or boiler with glycerine or a compound thereof, and heat the same to from 110° to 500° Fahrenheit. In order to point out in detail the manner in which our said invention may be practically applied, we refer to the accompanying drawing, in which A represents a boiler or vessel; B, a condenser; C, a force-pump; D, a feeder; and E, the cylinder of an ordinary engine. By opening the valve *b* a small quantity of bisulphide of carbon from the feeder D is run into the vessel A, through a perforated pipe, *a*, and is there brought in contact with the heated glycerine G, producing a pressure of vapor corresponding to the amount of bisulphide of carbon allowed to enter said vessel A.

The engine is now started by opening the usual inlet-valve on the supply-pipe *c*, and the vapor after imparting its force in the cylinder is discharged into the exhaust-pipe *d*, which proceeds direct to the condenser B, wherein by a series of coils, cooled by water flowing into the cistern *e*, by the valve *f*, and exit by an over-flow, $g$, the bisulphide vapor is condensed again into the liquid form, which then passes down into a vessel called a "receiver," (shown at $h$,) in which it is stored for reuse.

To regulate the flow of the bisulphide liquid so as to obtain a uniform quantity, the receiver $h$ is connected by a double pipe, $i$ and $j$, with the force-pump C, and by a pipe, $k$, to the feeder D, so that the latter vessel, which holds a quantity of the material, is supplied as required, and regulates a steady flow by the valve $b$ independent of the action of the pump.

To ascertain the contents of the feeder and receiver, two glass gages are fixed at the points $l$ and $m$. At $n$ is a gage for indicating the amount of vacuum produced by the condenser, and is therefore useful to determine the necessary quantity of water by the inflow-valve $f$. The feeder D has a valve, $p$, and a pipe, $o$, at its upper part direct to the top of the boiler or evaporator, so as to equalize the pressure and flow of the liquid bisulphide by the valve $b$, as before explained.

Further, to insure against any loss of material, through an accidental excess of pressure, the safety-valve is connected by a branch pipe, $s$, to the exhaust-pipe $d$; such an excess of vapor, if any, may thus be saved by passing direct to the condenser.

We have already stated the chemical objections arising from the presence of aqueous moisture. The mechanical presence of atmospheric air, which is not condensable into a liquid form, would prevent, to a large extent, a proper condensation of the vapor of bisulphide of carbon, and thereby create a back pressure instead of a vacuum, causing a loss from the power of the cylinder, equal to about seventeen to twenty pounds per square inch. Therefore, before running in the bisulphide of carbon by the funnel $v$, or starting our motor, (for the first time), we remove as far as possible all the air contained in the whole apparatus of vessels, pipes, cylinders, pump, and condenser. This is effected by working the pump C, by hand, and closing the circuit by the valves $b$ and $p$, and opening valve $t$.

It requires about 110° Fahrenheit to produce a very dense vapor from bisulphide of carbon. The high heat obtainable by heating glycerine expands this vapor under the common law of gases—that is, any excess of sensible temperature over 110° produces an expansion of $\frac{1}{460}$ for each degree. Therefore, if this amount of sensible heat be present, which is possible by our invention, we gain double the power hitherto obtained from a given amount of bisulphide of carbon.

During evaporation the small portion of glycerine mechanically forced from the bulk thereof proceeds with the vapor through and over every pipe or vessel to the cylinder, by which the power is utilized. Now, the gravity of bisulphide of carbon and glycerine being nearly the same, 1.272 and 1.260, it follows the liquid bisulphide does not sink down or come in contact with the metal of the boiler or evaporator, but is discharged as vapor from the surface of the bath of glycerine. This vapor may be utilized by any kind of engine capable of being used as a steam or air engine, and may be led by the exhaust-pipe direct to the condenser, for the purpose of extracting the latent and sensible heat, reconverting it again into the liquid form for reuse, as before explained.

We do not wish to confine ourselves to this particular arrangement of mechanism, as other modifications may be used. Now,

What we claim as our invention, and desire to secure by Letters Patent, is—

The herein-described method of utilizing bisulphide of carbon as a motive-power, viz., by bringing it in contact, in a boiler or suitable receptacle, with heated glycerine or a compound thereof.

THOMAS MARA FELL.
HENRY B. BUNSTER.

Witnesses:
WM. G. SMITH,
WM. WEBSTER.